TELEPHONE ANSWERING APPARATUS
Filed Oct. 15, 1962
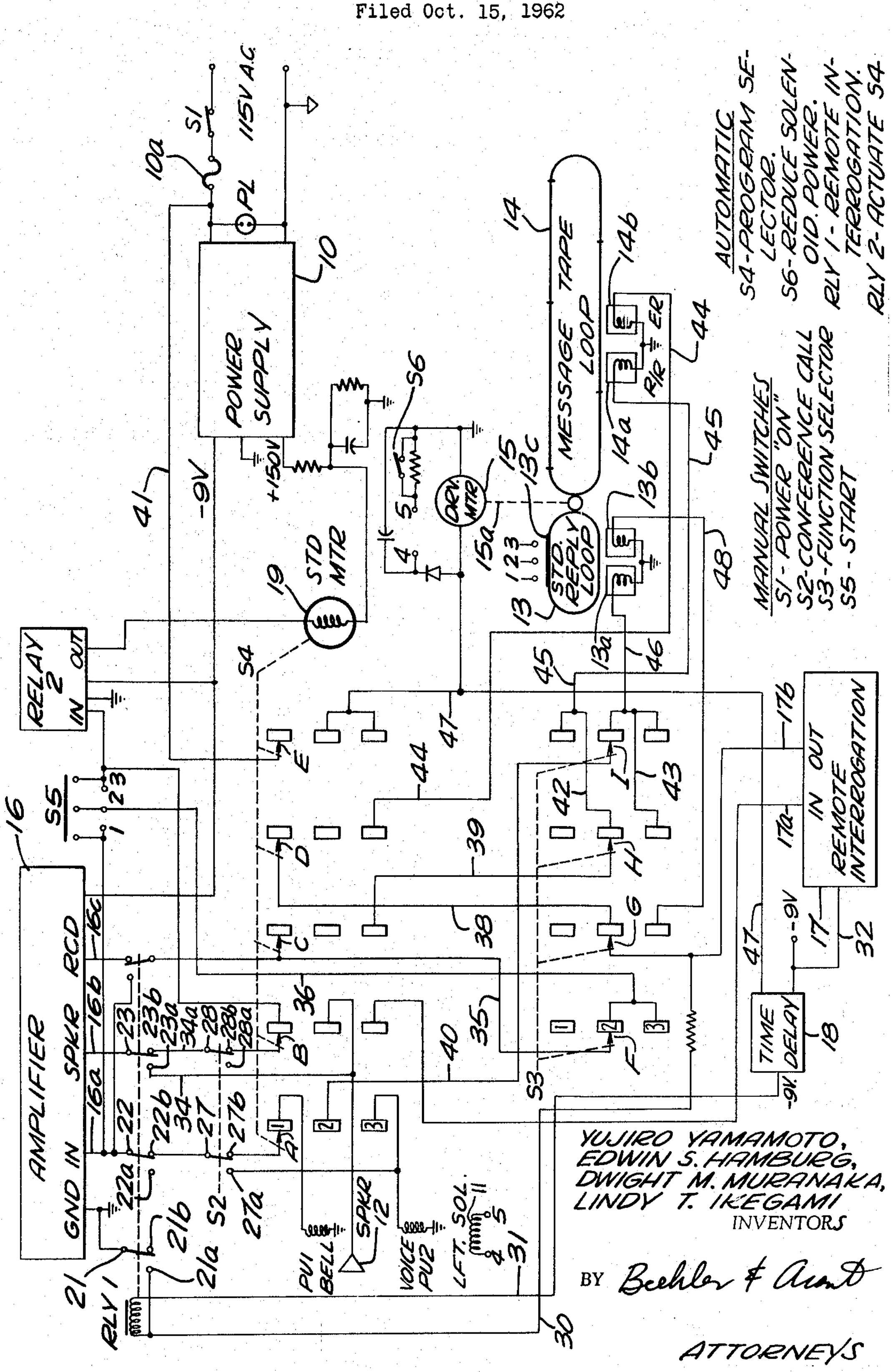
YUJIRO YAMAMOTO,
EDWIN S. HAMBURG,
DWIGHT M. MURANAKA,
LINDY T. IKEGAMI
INVENTORS
BY Beehler & Arant
ATTORNEYS 3,310,629
Patented Mar. 21, 1967

3,310,629

TELEPHONE ANSWERING APPARATUS

Yujiro Yamamoto, Edwin S. Hamberg, and Dwight M. Muranaka, Santa Ana, and Lindy T. Ikegami, Anaheim, Calif., assignors to Y2 Associates, Inc., a corporation of California Filed Oct. 15, 1962, Ser. No. 230,637
2 Claims. (Cl. 179—6)

The present invention relates to automatic telephone answering apparatus having a variety of improved features.

The conventional automatic telephone answering machine is a separate piece of equipment having its own power supply and including one or more transducers for communicating with the telephone instrument that it serves. During automatic answering operation an incoming call is recognized, and in response thereto a standard reply is transmitted through the telephone instrument onto the line. Thereafter a period of time is made available for recording the incoming message from the calling party. During the absence of the telephone user there may be a number of such calls received, and appropriate memory space is accordingly provided. When the user of the instrument returns he switches a manual control from an "automatic answering" position to an "interrogation" position, and the machine then plays back through a loud speaker the incoming messages which it has recorded during his absence.

In such machines it is generally found advantageous to use a circulating type of memory, preferably a tape. More specifically there are two separate tapes provided, one being of short length such as fifteen to thirty seconds for recording the standard reply, and the other being of substantially greater length for recording a plurality of incoming messages. A drive motor is associated with the tape memories, and it is necessary to turn the drive motor on and off at appropriate times in accordance with the automatic answering routine.

Another necessary function of this type of machine is lifting the receiver of the telephone instrument so that the incoming call may be received. For this purpose a lifting solenoid is provided.

It is also found to be a practical requirement in the system to provide amplification both of message signals and of control signals, and for this purpose an amplifier is included as a part of the system; but for reasons of economy a single amplifier is utilized for all such amplification purposes, and appropriate switching connections are provided to interconnect the proper circuits at the proper times.

One such conventional system is presently sold under the trade name "Ansa-Phone." This machine utilizes a manually operated control switch having five different positions, as well as various timing and relay circuits which accomplish other switching operations automatically. Thus the five positions of the manual switch correspond, respectively, to recording a new standard reply that is desired; playing back the recorded standard reply for verification purposes; automatic answering position of the machine; interrogate and playback of recorded messages; and conference calls. In the conference call position of the manual switch the loud speaker that is already required in the system for other purposes is utilized for the purpose of amplifying the conversations on the telephone line so that other persons in the room may hear the conversation.

In the presently conventional machines such as the Ansa-Phone the timing and switching circuits are quite complex and are accordingly expensive to manufacture. It is therefore desirable to achieve a simplification of these timing and switching circuits.

A further limitation of conventional machines is that the user of the telephone must return to the actual location of his telephone instrument in order to be able to interrogate the automatic answering machine. Thus, a traveling salesman may make an expensive trip back to his office merely for the purpose of picking up telephone calls that have come in during his absence. Obviously it would be far more advantageous if he were able to call in from a remote location, from another telephone instrument, and be able to interrogate the automatic answering machine located in his office.

One object of the invention, therefore is to provide telephone answering apparatus having a simplified circulating memory system.

A further object of the invention is to provide automatic telephone apparatus having simplified and improved timing circuits associated with the circulating memory system thereof.

Still another object of the invention is to provide telephone answering apparatus having simplified switching and control circuits for controlling the sequence of automatic operations of the system.

Yet a further object of the invention is to provide telephone answering apparatus that is not only subject to interrogation locally, at the physical location of the apparatus, but is equally subject to interrogation by calling in from a remotely located telephone instrument.

The objects and advantages of the invention will be more readily apparent from the following description considered in conjunction with the accompanying drawing, in which the sole figure is a schematic diagram of the presently preferred form of telephone answering system as provided by the present invention.

Referring now to the drawing a power supply 10 is fused by the fuse 10*a* and is controlled by an on-off switch S1. A transducer or pickup unit PU1 is provided for listening to the bell ringing signal of the associated telephone instrument, and a transducer or pickup unit PU2 is also provided for listening to voice or other message signals arriving from the telephone instrument. A solenoid 11 is provided for lifting the receiver of the telephone instrument in response to the bell ringing signal.

Upon interrogating the apparatus to play back messages that have been received and recorded, an audible report is desired, and for that reason a speaker 12 is incorporated in the system. Also, partly for legal reasons, the speaker 12 is utilized by the apparatus in generating the standard reply and supplying it acoustically to the telephone receiver.

The memory system includes a short tape loop 13 which is adapted for recordation of a standard reply or standard answer, and a long or message tape loop 14. The tape loops are driven in synchronism by a drive motor 15 having a shaft 15*a* that is operatively coupled to both of them. Thus when the standard reply is being generated the long tape loop 14 is circulating even though it is not in use, and when incoming messages are being recorded the standard reply loop 13 is circulating even though it is not in use.

Associated with the short tape loop 13 there is a read-write head 13*a* and also an erase head 13*b*. Similarly the long tape loop 14 has an associated read-write head 14*a* and erase head 14*b*. A special feature of the short tape loop is a conductive strip 13*c* located in one fixed position thereon, and utilized for switching purposes in conjunction with the timing operations, as will be explained subsequently.

An amplifier 16 has a signal input 16*a*, and two separate outputs 16*b* and 16*c*. The output 16*b* is a low-impedance and high-power output utilized for driving the speaker, while the output 16*c* is a high-impedance, low-power output utilized for driving the recorder.

Attention is now directed to the various switches included in the system, some of which are manually operated and others of which are operated automatically through the electrical controls contained within the system itself. The manually controlled switches will be described first.

As previously mentioned the switch S1 is utilized for turning on the power supply for the answering system. A separate switch S2 is provided for conference calls, for the purpose of permitting incoming calls to be amplified and delivered through the loud speaker. The function selector S3 has four movable contacts F, G, H, and I, each of which has three possible positions. Thus in the first position of the function selector S3 the movable contact F engages a stationary contact that may be referred to as F1; in the second position movable contact F engages a stationary contact that may be idetntified as F2; and so on. Position one of the function selector switch S3 is used for local interrogation of the answering system, in order to achieve audible playback of previously recorded incoming messages. Position two of the function selector S3 is the automatic answering position, in which the system largely controls its own timing and switching actions. Position three of the function selector S3 is utilized when it is desired to record a new standard reply on the short tape loop 13. Switch S5 is a manual start switch which is utilized for initiating the automatic operation of the system in the absence of an incoming telephone call. This is required, specifically, for the purpose of recording a new standard reply in conjunction with position three of S3, or for local interrogation in conjunction with position one of S3.

Referring now to the automatic switches, a micro-switch S6 is actuated by the lifting of the receiver, and serves to reduce the power supply to the solenoid coil 11 after the lifting action has been accomplished. This is done because the lifting power is no longer required when the receiver has been raised, and it is desired to avoid excessive current that might burn up the solenoid winding. Relay 1 is utilized to accomplish remote interrogation, in conjunction with the remote interrogation circuit 17, as will be explained. Relay 2 is utilized to actuate a stepping motor 19 which serves to step program selector S4 from one of its positions to the next. The program selector S4 is a stepping switch whose function it is to control the automatic programming of the internal operation of the system.

Thus the program selector S4 has three positions and utilizes the stepping motor 19 for stepping it progressively from one position to the next. The program selector S4 has five movable contacts identified as A, B, C, D, and E, respectively. Position one of the program selector S4 is the position for awaiting a call, which may be referred to as the bell listening position. In this position of the programmer the receiver is not raised and the memories are not operating. Position two of the programmer is the standard reply generating position. As the programmer moves from position one to position two, in response to reception of the bell ringing signal, the solenoid 11 is energized for lifting the telephone receiver and at the same time the drive motor 15 is energized for initiating circulation of both of the tape loops. Position three of the programmer is the position for recording incoming messages, and in this position the solenoid continues to be energized and the tape loops continue to circulate.

As previously mentioned it is necessary to utilize amplifier 16 for amplification of both message signals and control signals. Attention will first be given to the amplification of message signals. In position two of the programmer the standard reply is being picked up from short tape loop 13 by the read-write head 13*a* and passes along lead 46 to stationary terminal 12 of function selector S3, hence through lead 40 to stationary terminal A2 of the programmer, and hence through movable contact A and lead 33 to amplifier input 16*a*. The amplifier output signal passes from the high-power output terminal 16*b* through lead 34*a*, movable contact B and fixed terminal B2, to the speaker 12. The audible signal from the speaker is then picked up by the telephone receiver. At the same time power is being supplied along lead 41 to contacts E and E2 and hence via lead 47 to drive motor 15 and solenoid 11. In position three of the programmer the amplifier connections are essentially reversed, with the amplifier input being coupled through movable contact A and fixed contact A3 to pick up PU2 that receives the voice or other message signals from the telephone instrument. At the same time the output signal from the amplifier passes through its lower-power output terminal 16*c* via movable contact C and fixed contact C3 to the lead 39 and hence through movable contact H and fixed contact H2 and leads 42 and 45 to the read-write head 14*a*. Erasing of tape 14 is accomplished immediately ahead of the recording, with erasing current being supplied along leads 31, 30, 38, 44 to erase head 14*b*.

In the first position of the programmer a control signal is amplified. More specifically, the bell ringing signal picked up on PU1 passes through fixed contact A1, movable contact A, and lead 33 to the amplifier input 16*a*. The amplifier output then passes through its high-power output terminal 16*b* to lead 34*a*, movable contact B, fixed contact B1, and lead 37 to the input of relay 2. The output of relay 2 is coupled in series with stepper motor 19 for selectively closing the motor circuit, and thereby permitting the stepper motor to advance the programmer from its position one to its position two.

When the programmer is in position two the advancing signal is derived from a different source. As previously mentioned the short tape loop 13 carries a conductive strip 13*c*, and this conductive strip at one position of the tape simultaneously engages three terminals numbered 1, 2, and 3. These same three terminals appear in conjunction with the manual start switch S5. In position two of the programmer the end of tape switch causes the low-power amplifier output 16*c* to be coupled through lead 35, movable terminal F, fixed terminal F2, lead 36, and switch terminal 2, to the switch terminal 1 and amplifier input terminal 16*a*. The amplifier 16, by virtue of this feedback coupling, becomes oscillatory and generates an oscillating signal in the audible frequency range. Through terminal 3 of the end of tape switch this audible signal is applied to the input of relay 2, and actuates the relay for closing the circuit of stepper motor 19 and thus permitting the programmer to be advanced from position two to its position three. At the same time the audible output signal from the amplifier appears on its other output terminal 16*b* and is supplied to the speaker and hence goes out over the telephone instrument and is heard by the person making the incoming call. This "beep" signal indicates to the calling party that the standard reply has been completed and it is now time for him to start giving his message that is to be automatically recorded by the machine.

In position three of the programmer the advancing signal is again derived from the end of tape switch 13*c* on the short tape loop 13. This is true despite the fact that the short tape loop is not actually being used for message purposes in position three of the programmer. It will be seen that the end of tape switch 13*c* is not coupled through the message channels, and hence despite the fact that the long tape loop 14 is operatively connected in the message circuit, it is the end of the short tape loop 13 which generates the advancing signal. The advancing signal is fed to relay 2 in the same manner as before, and the programmer then returns to its initial position one for awaiting the next call.

In the drawing the function selector S3 and the programmer S4 are shown in their positions for automatic answering, awaiting an incoming call. As each incoming call is received the programmer advances progressively from position one to position two to position three and hence back to position one, where it again awaits the next incoming call. When the user of the telephone returns to his office and wishes to interrogate the answering machine he first depresses the start button S5, causing the programmer to advance from its position one to its position two, and he then moves the function selector S3 from its position two to its position one. Not only is the message pickup switched from the short tape to the long tape but the stepping action normally accomplished by switch 13*c* is also interrupted. Alternatively, if the user of the telephone instrument wished to record a new standard reply he would first depress the start button S5 and then move the function selector S3 to its position three. Erasing current is then supplied along lead 48 to erase head 13*b* while head 13*a* is operatively connected for recording via lead 43.

A significant novel feature of the invention is utilizing a long tape 14 whose capacity is an odd multiple of the capacity of tape 13. Thus where the ratio is five, as illustrated, incoming calls are recorded on tape 14 in message spaces 1, 3, 5, 2 and 4, in that sequence. Full utilization of tape capacity is therefore achieved.

Another significant novel feature of the invention is the provision for remote interrogation. The user of the telephone calls in from another telephone instrument, listens to the standard reply, and then generates an interrogation signal. A small portable audio oscillator of predetermined fixed frequency may, for example, be used for this purpose. After amplification this signal passes from output 16*b* to contacts B and B3 and hence to input 17*a* of remote interrogation circuit 17. When the predetermined calling signal is recognized, output terminal 17*b* of the circuit 17 is shorted to ground, thus placing full powed supply voltage across relay 1 which is thereby actuated. Contact 21 provides a latching function for relay 1, and also shorts out the erasing current for erase head 14*b*. Contact 22 disconnects voice pickup coil PU2 from the amplifier input. Contact 23 connects the amplifier speaker output to speaker 12. Contact 24 switches head 14*a* to the input of the amplifier, to serve as a reading head, and also disables the "beep" generating circuit.

Time delay device 18 is set for a time period preferably about twice the length of tape 14. Advancing of programmer S4 from its first to its second position initiates the timing action of device 18. The next stepping of S4 is normally accomplished by the "beep" tone, but during remote interrogation when the "beep" generating circuit is disabled the timing action runs its full course, permitting the calling party to hear all of the recorded contents of tape 14. When the timing action is completed power is removed from line 31, thus returning relay 1 to its normal position, and the remote interrogation cycle has then been completed.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What we claim is:

1. In a telephone answering apparatus adapted for recording a standard answer to be played in response to each incoming call, for then recording each incoming call, and for selectively playing back the recorded incoming calls at a subsequent time for the user of the telephone instrument, the combination comprising:

a first circulating memory having a capacity adequate for recording the standard answer thereon;

second circulating memory for recording incoming calls thereon, and having a capacity which is greater than the capacity of said first circulating memory;

drive means for driving both of said circulating memories in synchronism;

means responsive to the reception of an incoming call for initiating the operation of said drive means;

means cooperable with said first circulating memory for transmitting said standard answer to the telephone instrument;

an amplifier;

a marker carried by said first circulating memory for generating a timing signal upon the conclusion of transmission of said standard answer, and upon the conclusion of subsequent complete circulations of said first circulating memory;

means for connecting the output of said amplifier to its input in response to the recognition of said marker, whereby the oscillation of said amplifier produces said timing signal;

and circuit means coupled to said second circulating memory and to said drive means, and responsive to the first occurrence of said timing signal for causing the incoming call to be recorded on said second circulating memory, and to the second occurrence of said timing signal for inactivating said drive means.

2. A telephone answering apparatus adapted for recording a standard answer to be played in response to each incoming call, for then recording each incoming call, and for selectively playing back the recorded incoming calls at a subsequent time for the user of the telephone instrument, comprising:

a first circulating memory having a capacity adequate for recording the standard answer thereon;

second circulating memory for recording incoming calls thereon, and having a capacity which is greater than the capacity of said first circulating memory;

drive means for driving both of said circulating memories in synchronism;

means responsive to the reception of an incoming call for initiating the operation of said drive means;

means cooperable with said first circulating memory for transmitting said standard answer to the telephone instrument;

a marker carried by said first circulating memory for generating a timing signal upon the conclusion of transmission of said standard answer, and upon the conclusion of subsequent complete circulations of said first circulating memory;

and circuit means coupled to said second circulating memory and to said drive means, and responsive to the first occurrence of said timing signal for causing the incoming call to be recorded on said second circulating memory, and to the second occurrence of said timing signal for inactivating said drive means;

said second circulating memory having a capacity which is an odd multiple of the capacity of said first circulating memory, the operation of said secon circulating memory being such that alternate message spaces thereon are utilized for recording successive incoming calls until after approximately two complete circulations of said second circulating memory the total capacity thereof is filled with incoming calls.

References Cited by the Examiner

UNITED STATES PATENTS

| | | | |
|---|---|---|---|
| 2,703,821 | 3/1955 | Kopp, et al. | 179—6 |
| 2,724,015 | 11/1955 | Van Peventer et al. | 179—6 |
| 3,050,585 | 8/1962 | Zimmerman | 179—6 |
| 3,067,289 | 12/1962 | Zimmerman | 179—6 |
| 3,127,474 | 3/1964 | Waldman | 179—6 |

BERNARD KONICK, *Primary Examiner.*

A. BERNARD, R. MORGANSTERN,
*Assistant Examiners.*